Sept. 1, 1925.
H. J. MURRAY
MOUNTING FOR VEHICLE INSTRUMENTS
Filed Aug. 22, 1921
1,552,223
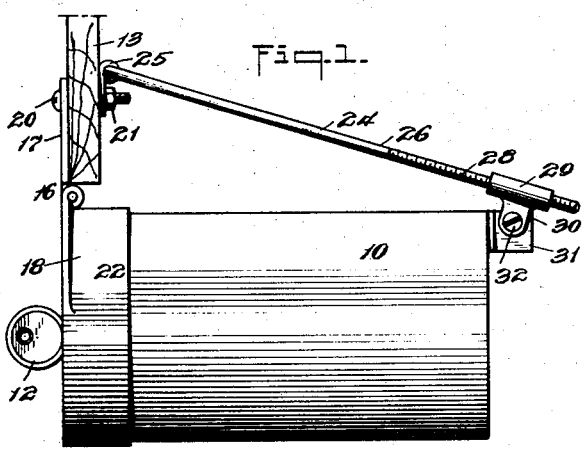
Fig.1.
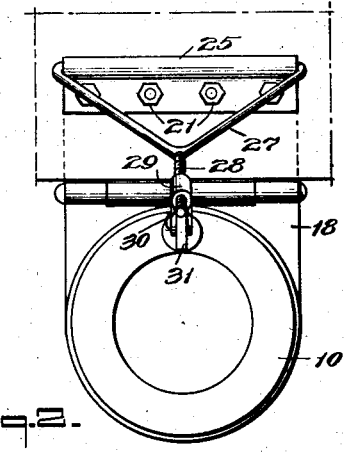
Fig.2.
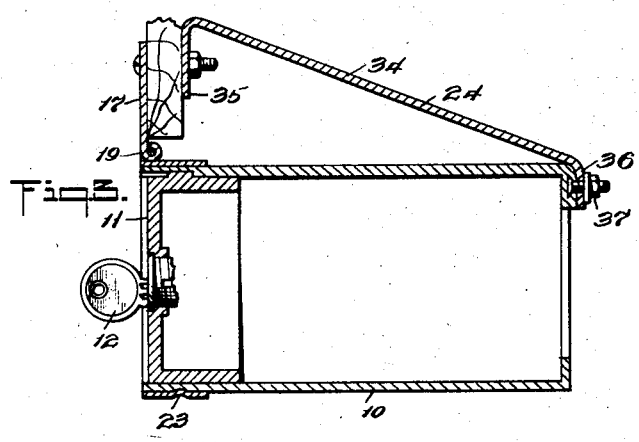
Fig.3.
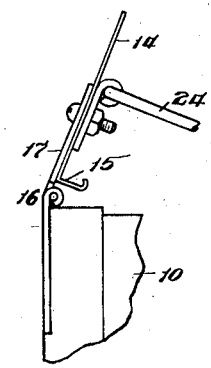
Fig.4.
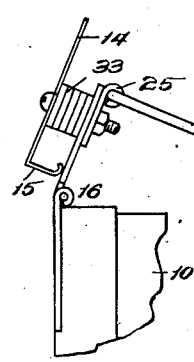
Fig.5.
Fig.6.
INVENTOR
Howard J. Murray
BY
Warren S. Oston
ATTORNEY Patented Sept. 1, 1925.

1,552,223

UNITED STATES PATENT OFFICE.

HOWARD J. MURRAY, OF NEW YORK, N. Y.

MOUNTING FOR VEHICLE INSTRUMENTS.

Application filed August 22, 1921. Serial No. 494,277.

*To all whom it may concern:*

Be it known that I, HOWARD J. MURRAY, a citizen of the United States, and resident of New York city, in the county of Kings and State of New York, have invented certain new and useful Improvements in Mountings for Vehicle Instruments, of which the following is a specification.

The invention relates in general to a mounting for suspending an instrument in adjustable position relative to its support, and the invention specifically relates to a mounting for positioning a vehicle instrument in position on the instrument board of an automotive vehicle.

The instrument board or dash board of vehicles now in general use are of different kinds, some of wood and others of metal, and are inclined at different angles, some being vertically disposed and others inclined backwardly at different angles to the vertical. It is required that the different instruments which are mounted on the instrument board be disposed in different positions, for instance, clocks, speedometers, and the like should be disposed so that the front face is easily seen by the operator and it is recalled that in pendulum controlled circuit closers such as is disclosed in my copending applications, Serial No. 352,214, filed January 17, 1920, and Serial No. 436,804, filed January 12, 1921, it is required that the instrument be horizontally disposed.

Accordingly, the primary object of the present invention is to provide a simplified form of mounting which can be used universally on the different types and positions of instrument boards now in general use, and which will dispose the instrument carried thereby in any desired angular position relative to the supporting instrument board.

Another object of the invention is to provide a universal type of mounting which may be secured in place simply by drilling bolt holes through the support in any desired position adjacent the lower edge of the support.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the arcompanying drawings:—

Figure 1 is a view in side elevation showing a preferred embodiment of the invention;

Figure 2 is a view in rear elevation of the showing in Figure 1 looking at the same from the right hand side;

Figure 3 is a sectional view taken vertically through the showing in Figure 1, but showing a slightly modified form of each member;

Figures 4, 5 and 6 are fragmentary views in side elevation of a part of the device shown in Figure 1 applied to instrument boards of various kinds; Figure 4 showing the installation of the instrument on the rear side and above the lower edge of a wooden dash board; Figures 5 and 6 showing the application of the mounting respectively to the front side and to the rear side of an instrument board of the metal type.

In the following description and in the claims, parts will be identified by specific names for convenience of expression but they are intended to be as generic in their application to similar parts as the art will permit.

In the drawings there is shown an instrument 10 which may be a mechanism containing casing of any usual form of instrument, or may be a burglar-proof shell or container, such as is described in my copending application, Serial No. 526,431, filed December 31, 1921, entitled "Automotive theft retardance device." In the form selected for illustration in this disclosure the instrument is in the form of a cylindrical casing with a closure cap 11 in the front end. In the showing in Figure 1, it is assumed that it is desired to mount the instrument so that the front end will be vertically disposed to facilitate the insertion of a key 12 from the space in advance of the instrument board 13. In the showing in Figures 1, 2 and 3 the instrument board 13 is of wood and therefore possesses some material thickness, while in the showing in Figures 5 and 6 the instrument board 14 is of metal, is provided with the usual rearwardly extending outlining flange 15 and is shown to be inclined to the vertical.

The front end of the instrument is pivotally mounted to the support by means of a hinge member 16 which includes two straps or parts, a support-engaging part 17 and an instrument engaging part 18 pivotally connected by engagement with a pivot pin 19 as is usual in the construction of hinge members. The upper or support-engaging part is in the form of a flat plate secured to the support by through bolts 20 passed therethrough and secured by nuts 21 threaded on the bolts. The instrument engaging part 18 is in the form of a cylindrical flange 22 which encircles the forward end of the instrument 10 and is secured thereto by means of peening the band so as to force the same into recesses formed in the outer surface of the instrument and thus form interlocking notches 23.

It is understood from this construction that the instrument as a whole can be swung into any desired angular position about the axis of the pin 19 as a center. The instrument is held in any desired adjusted position and in a preset angular relation to the support by means of a reach member 24.

Wherever it is desired that there be permitted some adjustability of the position of the instrument, the reach member 24, as shown in Figures 1 and 2, is pivotally connected to the support and includes an eye strap 25 secured to the support by means of the bolts 20 which secure the hinge member 17. The reach member 24 is formed of wire with one end bent into a triangle 26, one side 27 of which is passed through the eye member to form a pivotal connection therewith. The rear or free end 28 of the reach member is in the form of a threaded wire and a sleeve 29 is movable longitudinally thereon by the rotation of the sleeve. The sleeve is provided with an apertured lug 30 projecting laterally from the side thereof and the rear end of the instrument is provided with an ear 31. A set screw 32 is passed through the aligned apertures in the ear and lug to secure the sleeve against longitudinal movement on the reach rod and thus lock the rod to the instrument.

In the showing in Figure 6 washers are positioned on the bolts 20 so as to bring the hinge member clear of the flange 15. In the showing in Figure 3 the reach member is of a fixed length and includes a strap 34 with one end downwardly turned and flanged to provide a plate 35 for engaging the support and the opposite end flanged to provide a depending plate 36 secured to the rear end of the instrument by means of bolt and nut connections 37. This construction will be used where the distance to be spand by the reach member is set at a definite length and incidentally this form provides a cheaper construction than is disclosed in the preferred form of each rod with an adjustable length.

In operation and with the instrument mounted in position in the encircling band, the support engaging part of the hinge member is secured either to the front side of the wooden support as suggested in Figure 1, or to the front side of the metal support as suggested in Figure 5, or to the rear side of the wooden support and above the lower edge thereof as suggested in Figure 4 or to the rear side of the metal support and below the same as suggested in Figure 6. The sleeve is turned upon the threaded end of the reach rod to give the desired angular adjustment to the instrument after which the securing screw at the rear end of the reach rod is disposed in position.

It will be found that the device illustrated can be readily adopted for mounting on any of the instrument boards now in general use and can be mounted either in suspended position below the lower edge of the board or above the same as suggested in Figure 4. It is obvious that the instrument may even be mounted higher on the board by cutting away the lower edge of the board to accommodate the supported instrument. It is also within the scope of the invention to cut a hole through the instrument board, in spaced relation to its edges and to insert the instrument or the support therefor through the opening thus formed.

By means of the device herein disclosed it is possible to supply the trade with a standard form of mounting which can be utilized to mount any of the usual forms of vehicle instruments in any desired angularly adjusted position and on any of the usual forms of instrument boards. This permits the adjustment of the instrument on any vehicle to suit the personal requirements or wishes of any individual driver or operator; for instance, the face of a clock or speedometer can be readily adjusted so as to face squarely the line of vision of a tall or a short operator. The device disclosed is particularly applicable for use in mounting those instruments which work best when at some definite position such as is required in connection with pendulum actuated circuit closers.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device for hanging an instrument in adjustable angular position relative to and below a support, the combination of a two-part hinge member, one of said parts provided with means for securing the same to the instrument to be mounted and the other part extending above the instrument provided with means for engaging the support adjacent its lower edge and a reach member between the support and a portion of the instrument spaced rearwardly from the first named means, said reach member acting to hold the parts of the hinge member in preset relation.

2. In a device of the class described, the combination of a support, an instrument mounted below the support, a hinge connection between the instrument and support, and a reach member extending rearwardly of the support and disposed between the support and instrument for securing the instrument in a preset angular relation to the support.

3. In a device of the class described, the combination of an upstanding support, an instrument hinged thereto and extending to the rear of the support, a reach member between the support and instrument for securing the instrument in a preset angular relation to the support and an adjustable connection between the reach member and the instrument and inaccessible from the front side of the support.

4. In a device of the class described, the combination with a support and an object to be supported therefrom, of a hinge member with one part in the form of a band telescoping the object and the other member secured to the support, a reach member pivoted at one end to the support, means adjustably secured at the other end and fastening means between said last named means and the object thereby to hold the same with a fixed angle between the parts of the hinge member.

5. In a device of the class described, the combination with a support and an object to be supported therefrom, of a hinge member with one part secured to the object and the other member secured to the support, a second hinge including a reach member pivoted at one end to the support, a sleeve threaded on said member and means for locking the adjustable sleeve to the object in spaced relation to the hinge member and for locking the sleeve against rotary movement on the reach member.

6. In a device of the class described, the combination with a support and an object to be supported therefrom, of a hinge member with one part secured to the object and the other member secured to the support, a reach member pivoted at one end to the support, a sleeve threaded on said member and advanced along the same by the rotation of the sleeve, said sleeve provided with a lug and a screw for securing the lug to the object and against rotation.

7. In a device for mounting an instrument, the combination with a metal casing for containing the instrument and a hinge member including a metal band encircling the casing, said band and casing provided with interlocking notches to secure one to the other and means distinct from the hinge member for fixing the angle between the elements of the hinge member.

8. An instrument mounting including a hinge member with a support-engaging part and an instrument-engaging part provided with means for mounting an instrument therein flush with the front side of said support engaging part and a reach member distinct from the hinge member extending rearwardly of said front side in a plane perpendicular to the axis of the hinge member and provided at its front end with means for securing the same to the support and with means at its rear end for securing the same to the rear end of the instrument carried by the instrument engaging part of the hinge member.

Signed at New York city, in the county of New York and State of New York this 18th day of August, A. D. 1921.

HOWARD J. MURRAY.